United States Patent [19]

Cecil

[11] Patent Number: 5,288,968
[45] Date of Patent: Feb. 22, 1994

[54] RESISTANCE WELDING GUN AND APPARATUS

[76] Inventor: Dimitrios G. Cecil, 1277 Ashover Dr., Bloomfield Hills, Mich. 48304

[21] Appl. No.: 911,173

[22] Filed: Jul. 9, 1992

[51] Int. Cl.$^5$ .............................................. B23K 11/10
[52] U.S. Cl. ................................................................ 219/89
[58] Field of Search ................... 219/89, 86.25, 86.33, 219/86.51, 86.41, 90, 109, 110; 33/558; 73/708

[56] References Cited

U.S. PATENT DOCUMENTS

| | | | |
|---|---|---|---|
| 4,296,304 | 10/1981 | Defourny | 219/86.41 |
| 4,425,073 | 1/1984 | Mattsson | 219/86.41 |
| 4,524,624 | 6/1985 | Di Noia et al. | 73/708 |
| 4,542,277 | 9/1985 | Cecil | 219/109 |
| 4,543,732 | 10/1985 | Maples | 33/558 |
| 4,970,361 | 11/1990 | Fuse | 219/86.41 |

FOREIGN PATENT DOCUMENTS 54-27183  9/1979  Japan .................. 219/86.24

*Primary Examiner*—Geoffrey S. Evans
*Attorney, Agent, or Firm*—Brooks & Kushman

[57] ABSTRACT

A method and apparatus for diagnosing various faults during resistance welding based upon electrode position. An electrode positioning bracket is coupled to the electrode. The position of the bracket is measured by means of a linear variable displacement transducer. The position of the bracket is used to determine the electrode position, and in turn, electrode positioning faults, and weld quality.

17 Claims, 4 Drawing Sheets

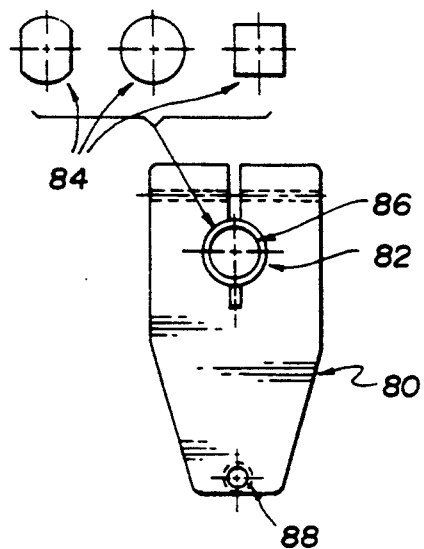
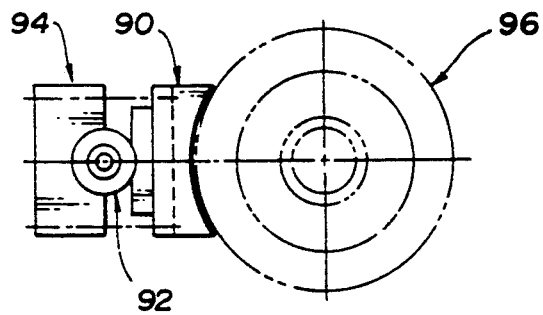
*Fig. 4a*
*Fig. 4b*
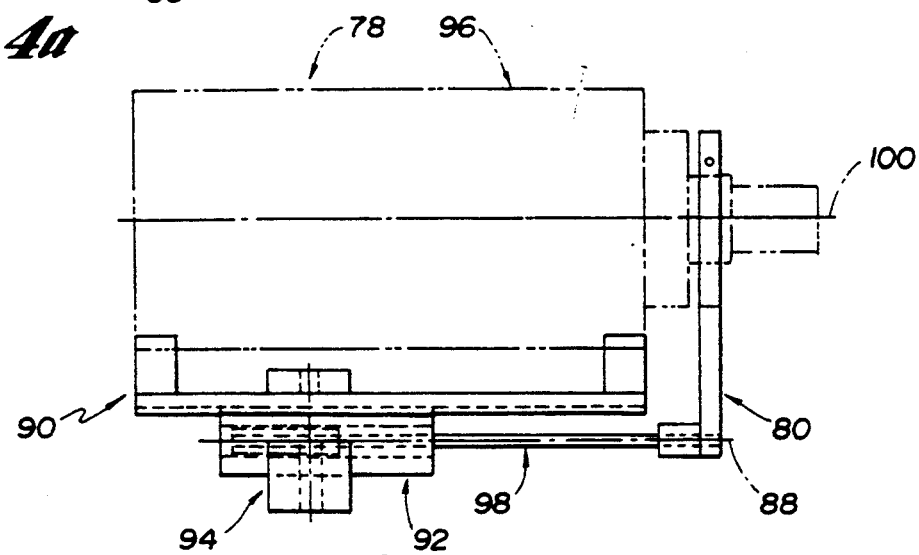
*Fig. 4c*
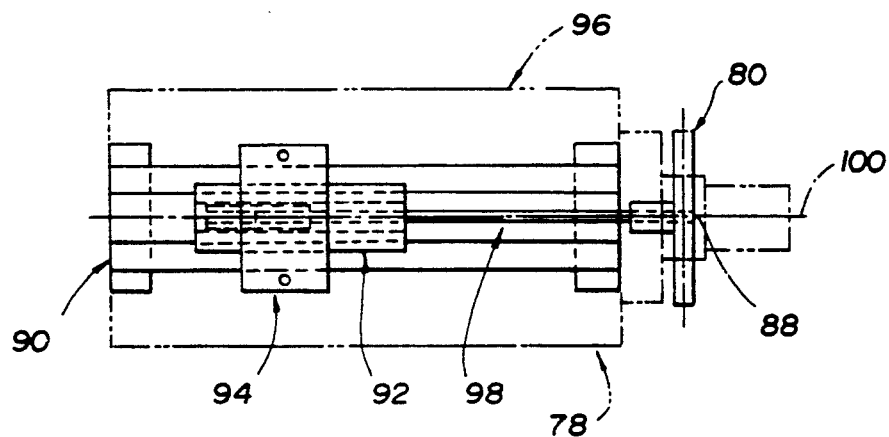
*Fig. 4d*

RESISTANCE WELDING GUN AND APPARATUS

TECHNICAL FIELD

This invention relates to welding guns, and more particularly, to resistance welding guns used in conjunction with an automated welding system.

BACKGROUND ART

Conventional resistance spot welding techniques employ a method by which metal surfaces are joined together in one or more spots. Workpieces are held together under force by one or more electrodes. The contacting surfaces are heated by a pulse of high amperage current generated by contact with the electrodes to form what is known as a weld nugget at the interface between the two surfaces. When the flow of current ceases, the electrode force is ordinarily maintained for a short period of time to allow the weld nugget to cool and solidify forming a strong mechanical bond. An excellent discussion of the details of the metallurgical phenomena that occurs during resistant spot welding is found in Nied "The Finite Element Modelling of the Resistance Spot Welding Process", *Welding Research Supplement*, pp. 123-132 (Apr., 1984).

The popularity of resistance spot welding is due in large part to its capability of rapidly producing welds with apparatus that can be used in automated production For instance, U.S. Pat. No. 4,861,959 to Cecil discloses a resistance welding gun for cooperation with a robotic arm. This type of device affords a production system great versatility for high volume applications.

While resistance spot welding has many advantages, it is difficult to control the process satisfactorily in order to produce consistently good welds. Many different factors must be controlled such as voltage, current, pressure, heat loss, shunting, and electrode wear, as well as the thickness and composition of the workpiece material. Many of these variables are difficult to consistently control.

Several attempts have been made to automatically control resistance spot welding processes. For example, some techniques have been designed to regulate the amount of energy used during the weld cycle. To this end, current sensors and voltage regulators have been incorporated into feedback systems to compare the detected levels with certain preset references. These feedback systems are disadvantageous from the standpoint that they do not directly detect physical characteristics of the weld itself but instead rely upon detection of secondary parameters. This can lead to poor weld quality when uncontrolled parameters vary from nominal operating conditions.

Other techniques provide means for determining whether the metal of the workpieces have reached a molten state. If the metals to be welded do not reach the temperature required to become molten, an insufficient weld could result. It has been shown through measurements that when the molten state is reached, the electrodes, which are being forced against the workpiece, begin to move into the metal. Accordingly, it has been suggested that the detection of melting by sensing subsequent inward movement of the electrodes, called indentation or penetration, is a potentially good way of determining the state of the weld. However, just because the metal reaches a molten state, does not always ensure that a good weld is made. For example, too much weld current will produce melting, but will not necessarily produce the formation of the weld nugget which is an important factor in generating a good weld. Other parameters will effect the size and configuration of the weld nugget and the many prior techniques of merely sensing inward movement of the electrodes into the workpieces cannot readily determine the extent of weld nugget growth. Thus, penetration alone is insufficient to determine weld quality.

U.S. Pat. No. 4,419,558 to Stiebel accomplishes the detection of electrode travel indirectly by utilizing a load cell to monitor the squeezing force applied through the electrodes to the workpieces. Among the disadvantages with this construction is that its sensor is located very close to the position at which the weld is made and it does not lend itself to incorporation into many welding gun designs.

An improved resistance spot welding apparatus is disclosed by U.S. Pat. No. 4,542,277 to Cecil for automatically and consistently detecting the quality of resistance spot welds. This device includes a cylinder with two opposite ends and a piston assembly within the cylinder. This piston assembly has a piston rod extending through both ends of the cylinder. One end of the piston rod is coupled to an electrode for making the weld and the opposite end of the piston rod is coupled to a sensor assembly for detecting the quality of the resulting weld as a function of movement of the piston rod.

This device, while having many innovative features, requires a custom two-ended cylinder for mounting the sensor assembly. A problem with this configuration is that it is not suitable for welding applications which require the space to the back of the cylinder for other functions such as the placement of mounting assemblies. In this case a two-ended cylinder would not be feasible. Further, the two-ended cylinder configuration does not provide for electrical isolation of the sensor necessary in welding operations due to the high currents produced. Lack of electrical isolation produces noise on the sensor signal. Some of the noise can be eliminated using software processing algorithms or processing circuitry. However, this extra processing cannot be provided without cost, and at best, it will filter some of the desired signal and leave some of the noise behind.

SUMMARY OF THE INVENTION

The present invention overcomes the problems of the prior art by sensing the electrode position by means of a novel electrode positioning bracket. An insulating sensor clamp is further provided to electrically isolate the sensor for suppressing the induced noise.

It is thus a general object of the present invention to provide a resistance welding apparatus for balancing a rotary part which includes a positionable base, an arm cooperating with the base and having an end shiftable between a retracted position and an operational position, a fluid-powered cylinder having a cylinder housing attached to the end of the arm and a cylinder rod axially shiftable relative to the cylinder housing between a retracted and an extended position, a bracket rigidly affixed to the cylinder rod, an electrode electrically insulated from the bracket, a guide way for limiting bracket rotation in the plane perpendicular to the cylinder rod while providing lateral support for translational motion of the bracket, and a transducer cooperating with the arm and the bracket indicating the relative position between the bracket and the arm for generating a signal indicative of this relative position for use in determining weld quality.

It is also a general object of this invention to provide a retro-fit electrode positioning bracket assembly for adapting an automated welding apparatus to allow incorporation of a electrode position transducer for use in determining weld quality.

BRIEF DESCRIPTION OF THE DRAWINGS

FIG. 4(A-D) is an elevation view of the electrode positioning bracket, an elevation view of the linear variable displacement transducer and mounting clamp assembly, a side view of the welding gun assembly, and a bottom view of the welding gun assembly.

BEST MODE FOR CARRYING OUT THE INVENTION

Figure 1:
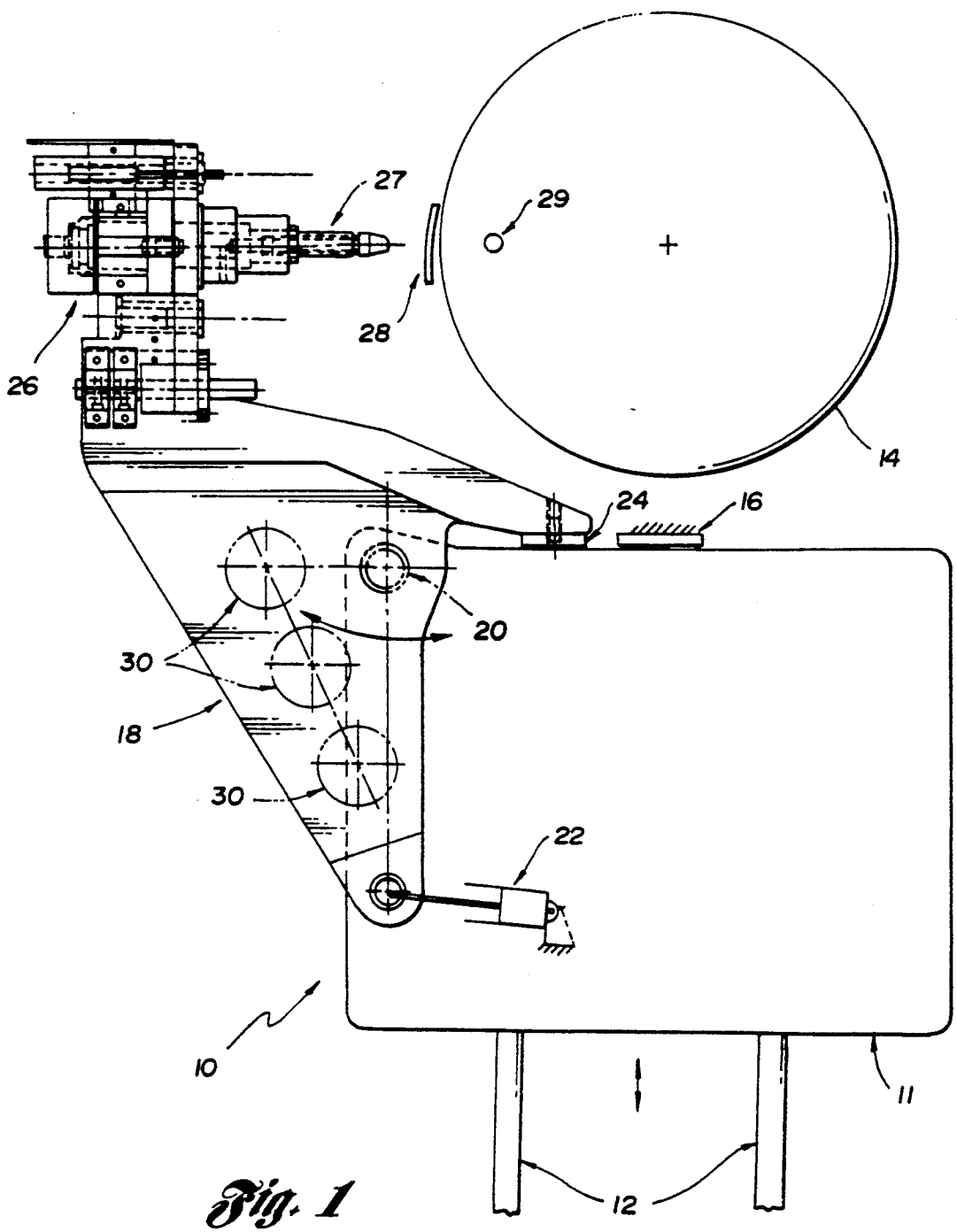
FIG. 1 is a plan view of the resistance welding apparatus.

FIG. 1 illustrates a resistance spot welding apparatus 10 incorporating the features of the present invention. A base 11 is mounted on a sliding track 12 along a fixed orientation to rotary part 14 to be balanced. The base is positionable between a retracted position and an operational position against base-stop 16. Arm 18 is pivotable about pin 20 which is rigidly attached to the base 11. Arm 18 includes holes 30 for the purposes of reducing the weight. This arm provides a platform for mounting the welding gun assembly 26. Fluid-powered cylinder 22 actuates arm 18 between a retracted position clear of rotary part 14 and an operational position against the arm-stop 24. Electrode 27 and electrode 29 (shown in top view) provide current to weld balance weight 28 to rotary part 14.

Figure 2:
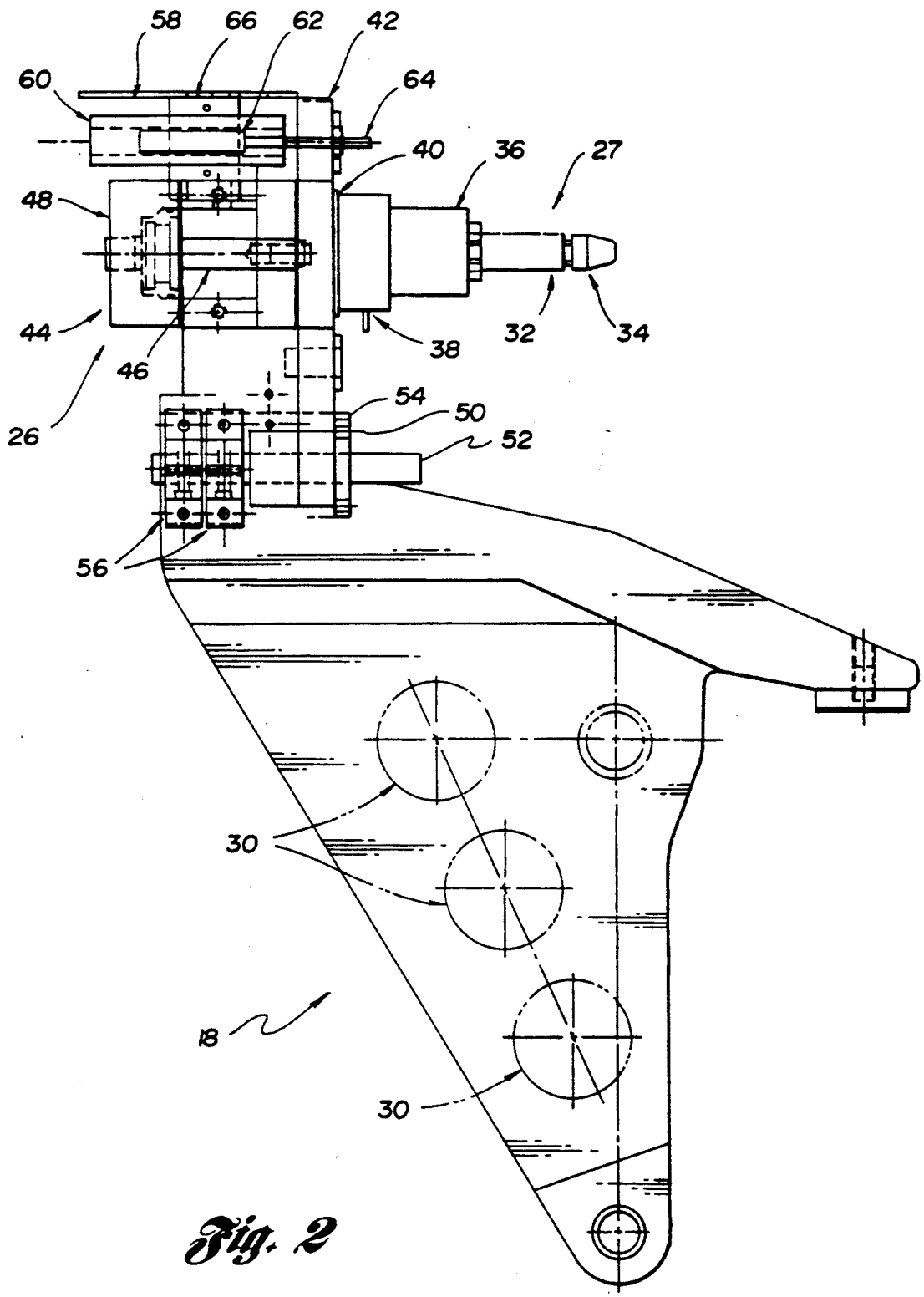
FIG. 2 is a detailed plan view of the resistance welding gun and arm assembly.

Turning now to FIG. 2, welding gun assembly 26 and arm 18 are shown in more detail. This welding gun assembly contains an electrode 27 which consists of electrode cap 34 and electrode shaft 32. Electrode shaft 32 is secured by means of electrode holder 36 which is connected to terminal 38 for supplying a voltage potential to electrode 27. Electrode holder 36 is secured to an electrode positioning bracket 42 and electrically isolated by means of insulator 40. This insulation is important given the high currents produced in the welding process and the resulting high intensity magnetic fields which will be present.

Electrode 27 is positionable by means of fluid-powered cylinder 44. This cylinder consists of cylinder rod 46 rigidly attached to the electrode positioning bracket 42 and cylinder housing 48 which is rigidly attached to arm 18. Electrode positioning bracket 42 is stabilized by means of shaft assembly 50 which consists of shaft 52, bushing 54 which holds shaft 52 and is affixed to electrode positioning bracket 42, and shaft clamps 56 which affix shaft 52 to arm 18. This shaft eliminates rotation of electrode positioning bracket 42 in the plane radial to cylinder rod 46.

The position of electrode positioning bracket 42 and thus, the position of the electrode is determined by means of linear variable displacement transducer 65 (LVDT) 58. This transducer consists of a transducer body 60 having a cylindrical core receptacle, a transformer core 62 and a core rod 64. The transducer body is attached to arm 18 by means of isolating clamp 66. This clamp is constructed of phenolic material so as to insulate transducer body 60 from arm 18. This insulation is important, since LVDT 58 is susceptible to induced noise. The high currents and magnetic fields previously mentioned require the transducer to be insulated in this manner. For the same reason, transducer body 60 is sheathed in stainless steel which is substantially nonmagnetic. Further, core rod 64 is constructed of stainless steel.

The system operates as follows. Rotary part 14 is rotated at high speeds so as to determine the location and the amount of weight to be welded to the part so as to balance the part. The base is in the retracted position during this operation. Once this operation is completed, the base is shifted to an operational position against base-stop 16. The arm is shifted to its operational position against the arm-stop by means of fluid-powered cylinder 22. A balance weight 28 is cut to size given the amount of weight calculated to balance rotary part 14. Balance weight 28 is positioned between rotary part 14 and the retracted electrode by means of a weight mounting apparatus well know to those skilled in the art. The electrode is in turn positioned by means of fluid-powered cylinder 44 so as to hold balance weight 28 against rotary part 14. The position of the electrode is calculated from the linear variable displacement transducer output. This position, called the fitup position, is compared to a set of dimensional tolerances to determine if the balance weight, the rotary part and the electrode are all positioned correctly. If the fitup position is out of tolerance indicating improper positioning or excessive electrode wear, a fault is indicated and the weld does not proceed. Weld pressure is applied by means of cylinder 44 and the position of the electrode is again measured to determine the amount of penetration. As with the fitup position, the penetration position must be within set dimensional tolerances for the weld to proceed.

If the weld proceeds, weld voltage is applied to the first electrode and the ground electrode creating a weld current through balance weight 28 and rotary part 14. The amount of expansion of the weld nugget is monitored, again by the position of the weld electrode.

Figure 3A:
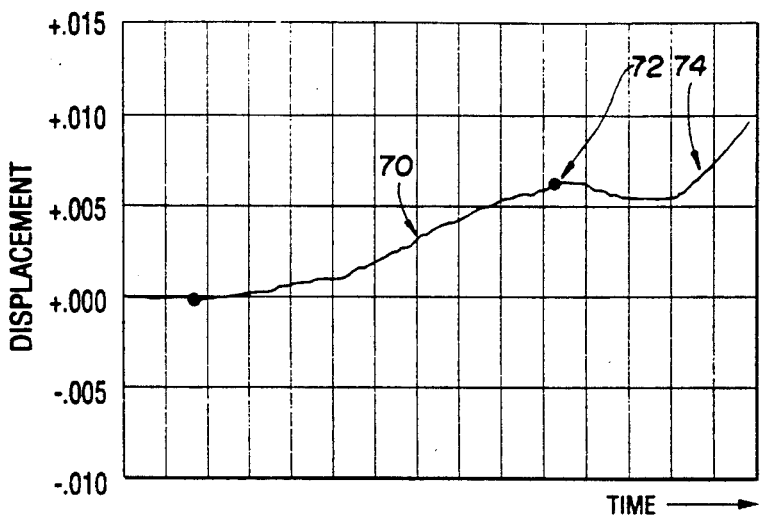
FIG. 3(A-C) is a series of electrode displacement curves which compare a good weld to two weld-fault conditions.

FIG. 3A presents the displacement voltage characteristic, as given by linear variable displacment transducer 60, for a good weld. As time increases the weld nugget grows as shown by positive displacement 70. Weld voltage is cut off at 72 once sufficient weld nugget growth is obtained. The weld voltage is cut off after a fixed amount of expansion so as to avoid weld nugget expulsion, a condition whereby weld expansion is taken to such a point such that the weld nugget material is forced out of the weld junction. The electrode is held in place for a short interval of time before being retracted 74.

Figure 3B:
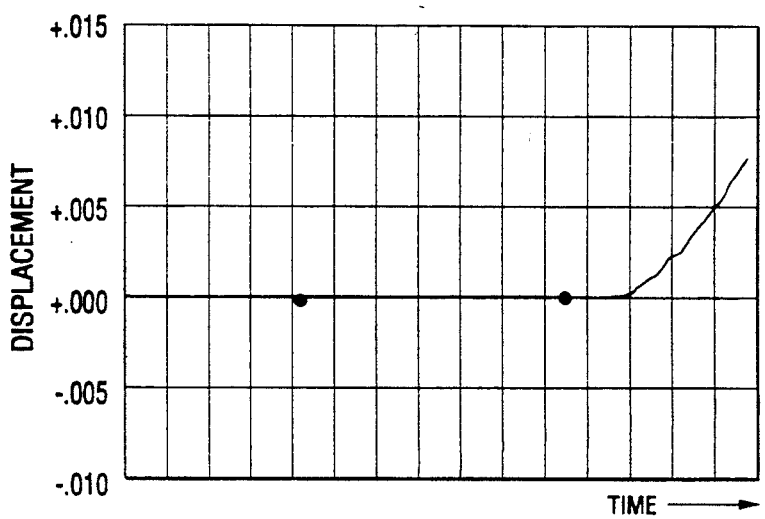
Figure 3C:
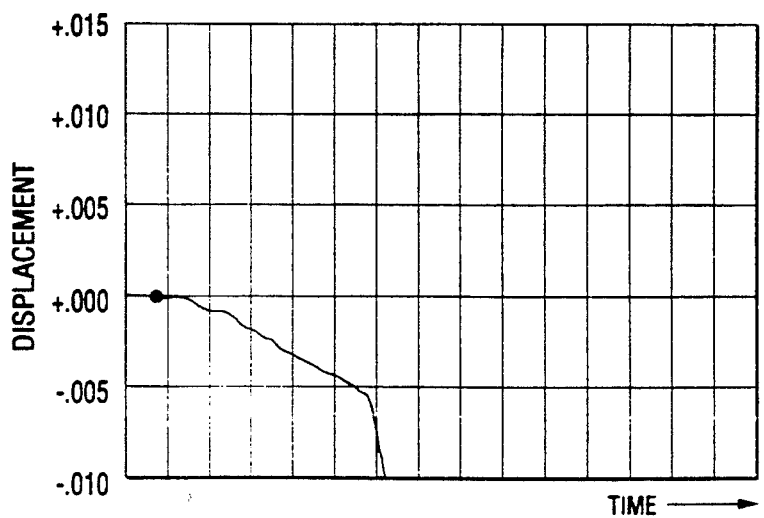

If the weld does not sufficiently expand after a preset amount of time, as presented by the displacement voltage characteristic in FIG. 3B due to some factor such as the presence of oil or other contaminants on balance weight 28 or rotary part 4, the weld voltage is cutoff and a fault is indicated. If the penetration of the electrode increases rather than decreases as presented by the displacement voltage characteristic in FIG. 3C due to some factor such as the fact that the electrode is positioned near the edge of balance weight 28, the weld voltage is cutoff and a fault is indicated.

Assuming a good weld has occurred, the electrode is then retracted by means of cylinder 44. The position of the electrode is then checked to determine if the electrode has, in fact, retracted, or in the alternative, has become fused to the welding surface. If the electrode is fused, a fault is indicated to avoid possible damage to the apparatus by proceeding with further positioning steps. If the electrode has retracted, the arm is placed in the retracted position, the base is placed in the retracted position, and the process continues iteratively with the introduction of a new rotary part.

An alternate embodiment of the invention 78 is presented in FIG. 4(A-D). An existing weld gun, consisting of an electrode actuated by a fluid-powered cylinder, can be retrofit with a electrode positioning bracket and a linear variable displacement transducer and an appropriate controller to take advantage of the innovative features of the present invention. FIG. 4A presents electrode positioning bracket 80 for mounting on an existing electrode, electrode holder, piston rod, or other similarly coupled part, similar to that those parts described earlier or their equivalents. Hole 82 receives the part to which electrode positioning bracket 80 is mounted via an insulated bushing 86. Bushing 86 insulates electrode positioning bracket 86 from the electrode as does insulator 40 in FIG. 2. The size and shape of Hole 82 is chosen to match the part to which electrode positioning bracket is mounted when considering the thickness and shape of insulation bushing 86. Receptacle 88 is for attaching transducer rod 98 to electrode positioning bracket 80.

FIG. 4B presents the attachment of the body of the linear variable displacement transducer 92 to cylinder housing 96 by means of mounting bracket with mating jaws 90 and 94. FIG. 4C and FIG. 4D present a side views of weld gun assembly 78. These figures highlight the rigid attachment of LVDT rod 98 with electrode positioning bracket 80, spaced apart from, and in parallel alignment to cylinder rod axis 100.

Though an alternate mechanical embodiment of the invention, the welding functions, weld quality diagnosis functions and the electrode positioning faults could be substantially similar to those previously described. In addition, one skilled in the art will see application of this technology beyond the realm of the rotary part balancing operation herein described.

It should be noted that the present invention may be used in a wide variety of different constructions encompassing many alternatives, modifications, and variations which are apparent to those skilled in the art. Accordingly, the present invention is intended to embrace all such alternatives, modifications, and variations as fall within the spirit and broad scope of the appended claims.

I claim:

1. A resistance welding apparatus for welding a balance weight on a rotary part, said apparatus comprising:
   a base, positionable in a fixed relative orientation to the rotary part to be balanced;
   an arm cooperating with the base and having an end shiftable between a retracted position clear of the rotary part and an operational position a fixed distance from the part;
   a first fluid-powered cylinder having a cylinder housing attached to the end of the arm and a cylinder rod axially shiftable relative to the cylinder housing between a retracted position and an extended position;
   a bracket rigidly affixed to the cylinder rod;
   a first electrode attached to and electrically insulated from the bracket;
   guide means for limiting bracket rotation in the plane perpendicular to the cylinder rod while providing lateral support for translational motion of the bracket; and
   a transducer cooperating with the arm and the bracket indicating the relative position between the bracket and the arm for generating a signal indicative of said relative position.

2. The resistance welding apparatus of claim 1 wherein the guide means comprises:
   a guide way spaced from and parallel to the axis of the cylinder rod; and
   a slide, cooperating with the guide way, said guide way and said slide coupled to the arm and the bracket to allow translationary motion while preventing rotational motion.

3. The resistance welding apparatus of claim 1 further comprising:
   a sliding track coupled to the base allowing translational positioning of the base between a retracted position and an operational position; and
   a stop for limiting translational motion of the base to the operational position.

4. The resistance welding apparatus of claim 1 further comprising a second fluid-powered cylinder cooperating with the base and arm for pivoting the arm with respect to the base.

5. The resistance welding apparatus of claim 1 further comprising a ground electrode electrically connectable to the rotary part in close proximity to the first electrode.

6. The resistance welding apparatus of claim 1 wherein the cylinder rod is oriented radially from the rotary part.

7. The resistance welding apparatus of claim 1 wherein the transducer is displaced from, and parallel to the cylinder rod axis.

8. The resistance welding apparatus of claim 1 wherein the transducer employs substantially nonmagnetic stainless steel sheathing.

9. A resistance welding apparatus comprising;
   a base;
   a positioning arm which is pivotably coupled to the base;
   a first electrode having an electrode shank;
   an electrode holder for securing the first electrode by securing the electrode shank;
   an electrode terminal electrically coupled to the electrode holder and the first electrode;
   an electrode positioning bracket, mechanically coupled to and electrically insulated from the electrode holder;
   a first actuator means for pivoting the positioning arm with respect to the base;
   a second actuator means, mechanically coupled to the electrode positioning bracket, for translating the bracket with respect to the positioning arm;
   a translation sensor for measuring relative position of the electrode positioning bracket with respect to the positioning arm by generating an electrical position signal indicative of the relative position;
   a sensor clamp for securing the translation sensor to the positioning arm and for providing electrical isolation between the arm and the sensor;

stop means for limiting the pivot of the positioning arm to a fixed position with respect to the base.

10. The resistance welding apparatus of claim 9 further comprising a bracket stabilization shaft for stabilizing the electrode positioning bracket during translation, comprising:
- a shaft bushing, operatively coupled to the electrode positioning bracket to allow motion translationary motion between the bracket and the shaft;
- one or more shaft clamps operatively coupled to the positioning arm so as to secure the shaft with respect to the arm.

11. The resistance welding apparatus of claim 9 wherein the base is on a sliding track.

12. The resistance welding apparatus of claim 9 further comprising a second electrode in electrical connection with the first part in close proximity to the first electrode.

13. The resistance welding apparatus of claim 9 further comprising diagnostic means for determining improper first electrode positioning based upon the position signal.

14. The resistance welding apparatus of claim 9 further comprising diagnostic means for determining an indication of weld quality based upon the position signal.

15. The resistance welding apparatus of claim 9 further comprising diagnostic means for determining an amount of first electrode wear based upon the position signal.

16. The resistance welding apparatus of claim 9 wherein the transducer is displaced from, and parallel to the cylinder rod axis.

17. The resistance welding apparatus of claim 9 wherein the sensor employs substantially nonmagnetic stainless steel sheathing.

* * * * *